(12) United States Patent
Ono et al.

(10) Patent No.: US 7,047,198 B2
(45) Date of Patent: May 16, 2006

(54) AUDIO INPUT DEVICE AND METHOD OF CONTROLLING THE SAME

(75) Inventors: Takeshi Ono, Tokyo (JP); Okihiko Nakayama, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 573 days.

(21) Appl. No.: 09/971,698

(22) Filed: Oct. 9, 2001

(65) Prior Publication Data

US 2002/0059067 A1  May 16, 2002

(30) Foreign Application Priority Data

Oct. 11, 2000  (JP) .......................... P2000-310115

(51) Int. Cl.
*G10L 21/00* (2006.01)
(52) U.S. Cl. ..................................... 704/275
(58) Field of Classification Search ................ 704/275; 455/419, 569; 74/335; 701/202; 340/999, 340/905; 304/439; 364/424.051; 342/357.07
See application file for complete search history.

(56) References Cited

U.S. PATENT DOCUMENTS

| | | | | |
|---|---|---|---|---|
| 5,835,008 | A * | 11/1998 | Colemere, Jr. ............... | 340/439 |
| 5,969,969 | A * | 10/1999 | Ejiri et al. .................... | 701/41 |
| 6,035,735 | A * | 3/2000 | Graf et al. .................... | 74/335 |
| 6,097,313 | A * | 8/2000 | Takahashi et al. ........... | 340/905 |
| 6,127,947 | A * | 10/2000 | Uchida et al. ............... | 340/999 |
| 6,181,343 | B1 * | 1/2001 | Lyons .......................... | 715/850 |
| 6,377,825 | B1 * | 4/2002 | Kennedy et al. ......... | 455/569.2 |
| 6,381,535 | B1 * | 4/2002 | Durocher et al. ........... | 701/202 |
| 6,480,147 | B1 * | 11/2002 | Durst et al. ............. | 342/357.07 |
| 6,728,531 | B1 * | 4/2004 | Lee et al. .................... | 455/419 |

FOREIGN PATENT DOCUMENTS

| | | |
|---|---|---|
| JP | 9-034488 | 2/1987 |
| JP | 7-121796 | 5/1995 |
| JP | 08-083093 | 3/1996 |
| JP | 8-083093 | 3/1996 |
| JP | 8-98051 | 4/1996 |
| JP | 8-130779 | 5/1996 |
| JP | 08-130779 | 5/1996 |
| JP | 8-214183 | 8/1996 |
| JP | 09-034488 | 2/1997 |
| JP | 10-9812 | 1/1998 |
| JP | 11-231889 | 8/1999 |

* cited by examiner

*Primary Examiner*—Susan McFadden
*Assistant Examiner*—Jakieda R. Jackson
(74) *Attorney, Agent, or Firm*—McDermott Will & Emery LLP

(57) ABSTRACT

An audio input device calculates respective degrees of coincidence between a user's vocalizations and recognition terms in a voice dictionary by speech recognition and extracts a recognition term having the highest degree of coincidence from the voice dictionary. Further, the audio input device outputs a command to operate one of installations, such as radio, CD player, air conditioner, etc. The audio input device includes a remote controller for transmitting signal waves to the installations equipped with receivers to carry out remote control of the installations. In operation, the larger the installation which the remote controller is directed to has a receiving intensity of the signal wave detected byte receiver, the larger the audio input device makes an extraction weight of the recognition terms concerned with the installation, in the voice dictionary.

12 Claims, 12 Drawing Sheets

| OBJECTIVE RECOGNITION TERM | | | | EXTRACTION WEIGHT |
|---|---|---|---|---|
| RADIO — FM — X | | | (301) | 1.0 |
| AM — X | | | (302) | |
| CD — DISC — X — TRACK — X | | | (303) | |
| X — PIECE | | | (304) | |
| X — MUSIC | | | (305) | |
| NUMBER — X | | | (306) | 1.0 |
| X — PIECE | | | (307) | |
| X — MUSIC | | | (308) | |
| NUMBER — X | | | (309) | |
| AIR CONDITIONER — X — DEGREES | | | (310) | |
| WIND — X | | | (311) | |
| X | | | (312) | 1.0 |
| X — DEGREES | | | (313) | |
| WIND — X | | | (314) | |
| X | | | (315) | |

FIG.2

| OBJECTIVE RECOGNITION TERM | |
|---|---|
| RADIO — FM — X | (1101) |
|     ＼ AM — X | (1102) |
| CD — DISC — X — TRACK — X | (1103) |
|    ＼ X — PIECE | (1104) |
|    ＼ X — MUSIC | (1105) |
|     ＼ NUMBER — X | (1106) |
| AIR CONDITIONER — X — DEGREES | (1107) |
|      ＼ WIND — X | (1108) |
|       ＼ X | (1109) |

FIG.6

| OBJECTIVE RECOGNITION TERM | EXTRACTION WEIGHT |
|---|---|
| RADIO ——— FM ——— X    (301)<br>　　　　＼ AM ——— X    (302)<br>CD ——— DISC ——— X ——— TRACK ——— X  (303)<br>　　＼—— X ——— PIECE    (304)<br>　　＼—— X ——— MUSIC    (305)<br>　　＼—— NUMBER ——— X    (306) | 1.0 |
| X ——— PIECE    (307)<br>X ——— MUSIC    (308)<br>NUMBER ——— X    (309) | 1.0 |
| AIR CONDITIONER ——— X ——— DEGREES    (310)<br>　　　　＼—— WIND ——— X    (311)<br>　　　　＼—— X    (312)<br>X ——— DEGREES    (313)<br>WIND ——— X    (314)<br>X    (315) | 1.0 |

FIG.8

| OBJECTIVE RECOGNITION TERM | | EXTRACTION WEIGHT |
|---|---|---|
| RADIO — FM — X | (301) | 1.2 |
| RADIO — AM — X | (302) | |
| CD — DISC — X — TRACK — X | (303) | 1.2 |
| CD — X — PIECE | (304) | |
| CD — X — MUSIC | (305) | |
| CD — NUMBER — X | (306) | |
| X — PIECE | (307) | |
| X — MUSIC | (308) | |
| NUMBER — X | (309) | |
| AIR CONDITIONER — X — DEGREES | (310) | 1.0 |
| AIR CONDITIONER — WIND — X | (311) | |
| AIR CONDITIONER — X | (312) | |
| X — DEGREES | (313) | |
| WIND — X | (314) | |
| X | (315) | |

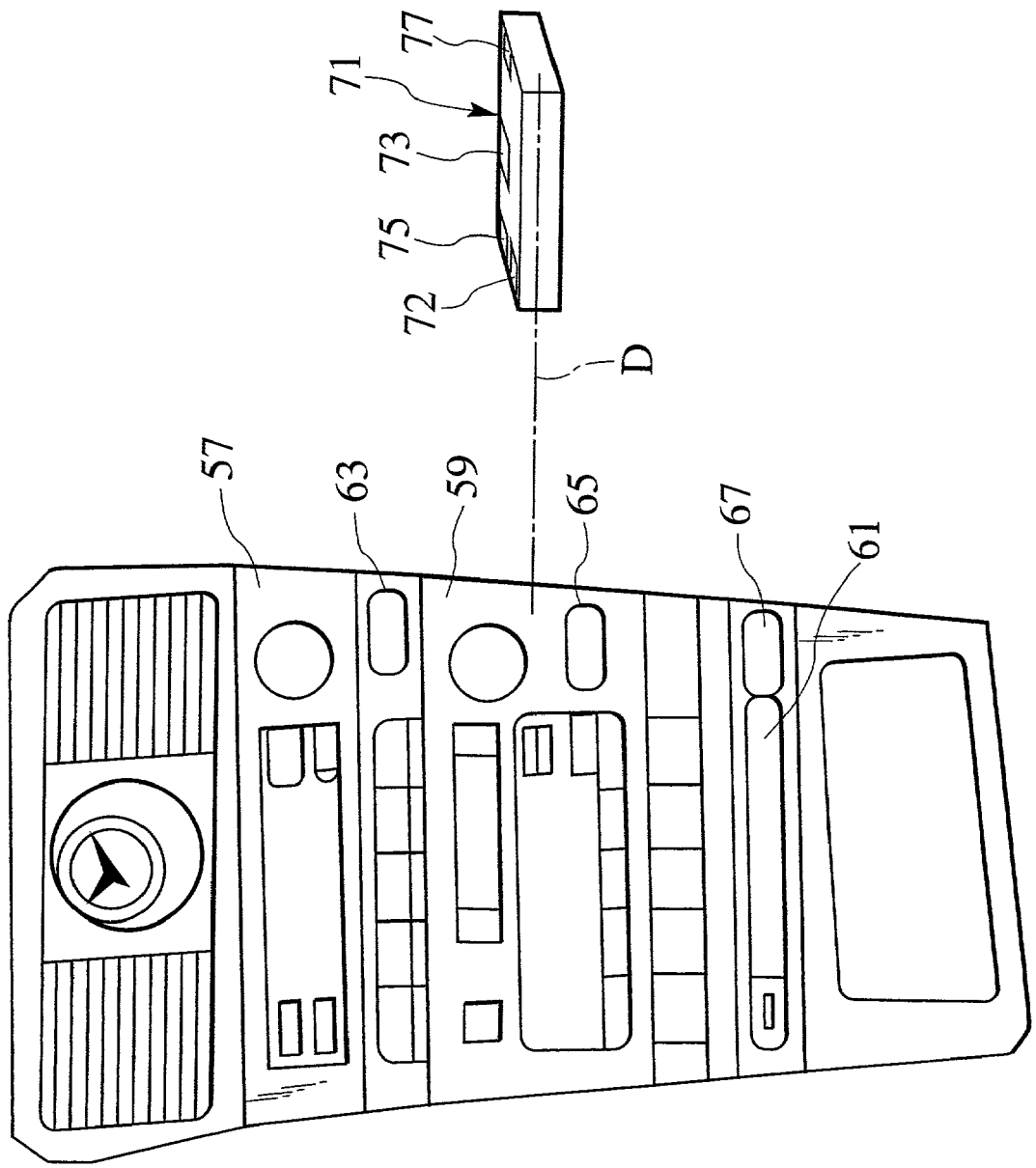

AUDIO INPUT DEVICE AND METHOD OF CONTROLLING THE SAME

BACKGROUND OF THE INVENTION

1. Field of the Invention

The present invention relates to an audio input device which calculates the degree of coincidence between vocalizations of a user and objective recognition terms stored in a voice dictionary of the audio input device, by means of speech recognition and which further extracts the objective recognition terms having the highest degree of coincidence from the voice dictionary to output a command to operate one of installations, the installation corresponding to the extracted objective terms.

2. Description of the Related Art

As an earlier technology, an audio input device as shown in FIG. 1 is proposed. This audio input device is installed in an automobile.

The audio input device has a signal-processing unit 5 including a CPU (central processing unit) 1 and a memory 3. An external memory 7 having a voice dictionary 7a is connected with the signal-processing unit 5.

As a pickup unit for picking up the user's vocalizations, a microphone 11 is connected to the signal-processing unit 5 through an A/D (analog/digital) convener 35. Similarly, an amplifier 15 for driving a speaker 17 is connected to the signal-processing unit 5 through a D/A (digital/analog) converter 13. Further, a dialogue start switch 19 and a monitor display unit 21 are together connected to the signal-processing unit 5. In operation, corresponding to a user's voice inputted through the microphone 11, the signal processing unit 5 outputs a command signal S to any one of installations 23, for example, radio, CD (compact disc) player, air conditioner, etc.

FIG. 2 shows the formation of the voice dictionary 7a stored in the external memory 7. In this voice dictionary 7a there are stored objective recognition terms which are used in ease of driving the radio, the CD player and the air conditioner by the user's voice. The external memory 7 is adapted so as to be able to accept the user's various vocalizations represented wit numerals 1101 to 1109 in the figure. Note, in FIG. 2, each alphabet X represents a definite number. For example, if the recognition terms corresponding to the numeral 1106 are extracted as a result of the user's vocalizing of "Cee Dee number ten!", then it is concluded that the speech recognition has been achieved successfully.

The above-mentioned audio input device operates as follows. FIG. 3 is a flow chart for explanation of the operation of the device.

First, at step 1200, the signal-processing unit 5 reads the voice dictionary 7a of the external memory 7 once the audio input device is powered on. At step 1201, it is judged whether or not the dialogue start switch 19 is operated by the user. If the judgement at step 1201 is Yes, then the routine goes to step 1202 where the sampling of vocalizations is initiated into the signal processing unit 5 corresponding to the user's vocalizing of the terms stored in the voice dictionary 7a.

For instance, if the user vocalizes "Cee Dee number ten!", the signal-processing unit 5 detects the user's vocalizations in the following maimer.

The sound data inputted through the microphone 11 is convened into digital signals by the A/D convener 9. Until the dialogue start switch 19 is operated by the user, the signal-processing unit 5 has calculated an average of the above digital signals with respect to their power (intensity of signals). On condition that the dialogue start switch 19 has been operated, when the instantaneous power of the specified digital signal is larger than the calculated "power" average of the digital signals by a predetermined value, then the signal processing unit 5 judges that the user has vocalized and further starts in reading the user's vocalizations.

Return to FIG. 3, at step 1203, it is executed to calculate the degree of coincidence between the group of recognition tens in the vocal dictionary 7a loaded into the memory 3 and the user's vocalizations, by the signal processing unit 5. The calculation of the degree of coincidence is carried out by HMM method as the mainstream of audio recognition algorithm in recent years. Not; even when calculating the degree of coincidence, the above-mentioned operation to read the user's vocalizations is maintained by the parallel processing of the unit 5. At step 1204, it is judged whether or not the user's vocalizing has been finished. For example, when the instantaneous power of the digital signal becomes less than a designated value for a predetermined period, then it is judged that the user's vocalizing has been finished and the routine goes to step 1205 where the operation to read the user's vocalizations is ended. While, if the judgement at step 1204 is No, the routine goes bank to step 1203 to maintain the above calculation.

At next step 1206, the signal-processing unit 5 selects the recognition term whose degree of coincidence is the highest. In the above instance, the recognition term "ten" following the term "Cee Dee", which corresponds to the alphabet X at the numeral 1106, has the highest degree of coincidence. Thereafter, at step 1207, the signal-processing unit 5 informs the user of a fact that the recognition term having a high degree of coincidence is now recognized, by means of a phonetic sound. (feedback of recognition results) In detail, at the same step, it is executed to synthesize an audio message of "Now, playing the tenth number of CD player!" from sound data stored in the external memory 7 and further executed to generate the same message to the user through the amplifier 15 and the speaker 17.

Next, at step 1208, the signal processing unit 5 judges whether or not a not-shown "decision" switch was pushed for a predetermined period. If the user's manipulation of the decision switch is detected (Yes), then the routine goes to step 1209 to output a command to operate the installation 23 corresponding to the objective recognition terms recognized in this routine. In this case, there is generated a command to allow the CD player to play the tenth music on the present compact disc installed therein the CD player. While, if the judgment at step 1208 is "No", that is, no detection of the user's manipulation of the decision switch, then the routine goes back to step 1201.

SUMMARY OF THE INVENTION

Meanwhile, the above-mentioned audio input device is adapted so as to usually accept the user's vocalizations originating with the names of installations to be operated (e.g. "Cee Dee", "Air Conditioner", etc.) in view of ensuring a high recognition ratio. Conversely, if the audio input device is constructed so as to accept the user's vocalizations deleting the names of installations, then there is an increased possibility that the voice dictionary includes the recognition terms whose vocalizations resemble each other.

In detail, if the name of installation "CD" is deleted from the group (numeral 1104) of recognition terms in the voice dictionary of FIG. 2, there remains the recognition term of "X piece". Similarly, if the name of installation "Air-Conditioner" is deleted from the group of recognition terms designated wit the numeral 1107, there remains the recognition term of "X degrees". Due to the similarity in vocalization between these recognition terms, there might be occurred an erroneous recognition in either case of the user who cannot vocalize the terms clearly or a noisy situation around the user. This is the reason why the voice dictionary including the names of installations is effective for recognizing the user's vocalizations. Nevertheless the so-constructed voice dictionary requires the user to vocalize both of the installation name and the details of operation to be performed by the concerned installation. Consequently, the required user's vocalization is apt to be lengthened, being accompanied with a burden on the user.

Under the above circumstance, it is an object of the present invention to provide an audio input device which is capable of shortening the required user's vocalization thereby to cancel the burden on the user while ensuring the ability of recognizing the user's vocalizations.

a pickup unit for picking up vocalizations of a user;

a calculating section for calculating respective degrees of coincidence between the user's vocalizations inputted through the pickup unit and the objective recognition terms in the voice dictionary;

wherein, at the calculation of the degrees of coincidence on receipt of the user's vocalizations, the controller makes the extraction weight of the objective recognition terms concerned with the installation estimated by the estimating section, larger than the extraction weight of the objection recognition terms concerned with the other installation.

BRIEF DESCRIPTION OF THE DRAWINGS

FIG. 2 is an explanatory diagram showing the structure of a voice dictionary of the audio input device of FIG. 1.

FIG. 6 is an explanatory diagram showing the structure of a voice dictionary of the audio input device of FIG. 4;

FIG. 8 is an explanatory diagram showing the structure of the voice dictionary of FIG. 6 with extraction weights;

FIG. 12 is an explanatory view showing the direction of the remote controller of the audio input device of FIG. 10.

DESCRIPTION OF THE PREFERRED EMBODIMENT

Embodiments of the present invention will be described below with reference to the accompanying drawings.

Figure 1:
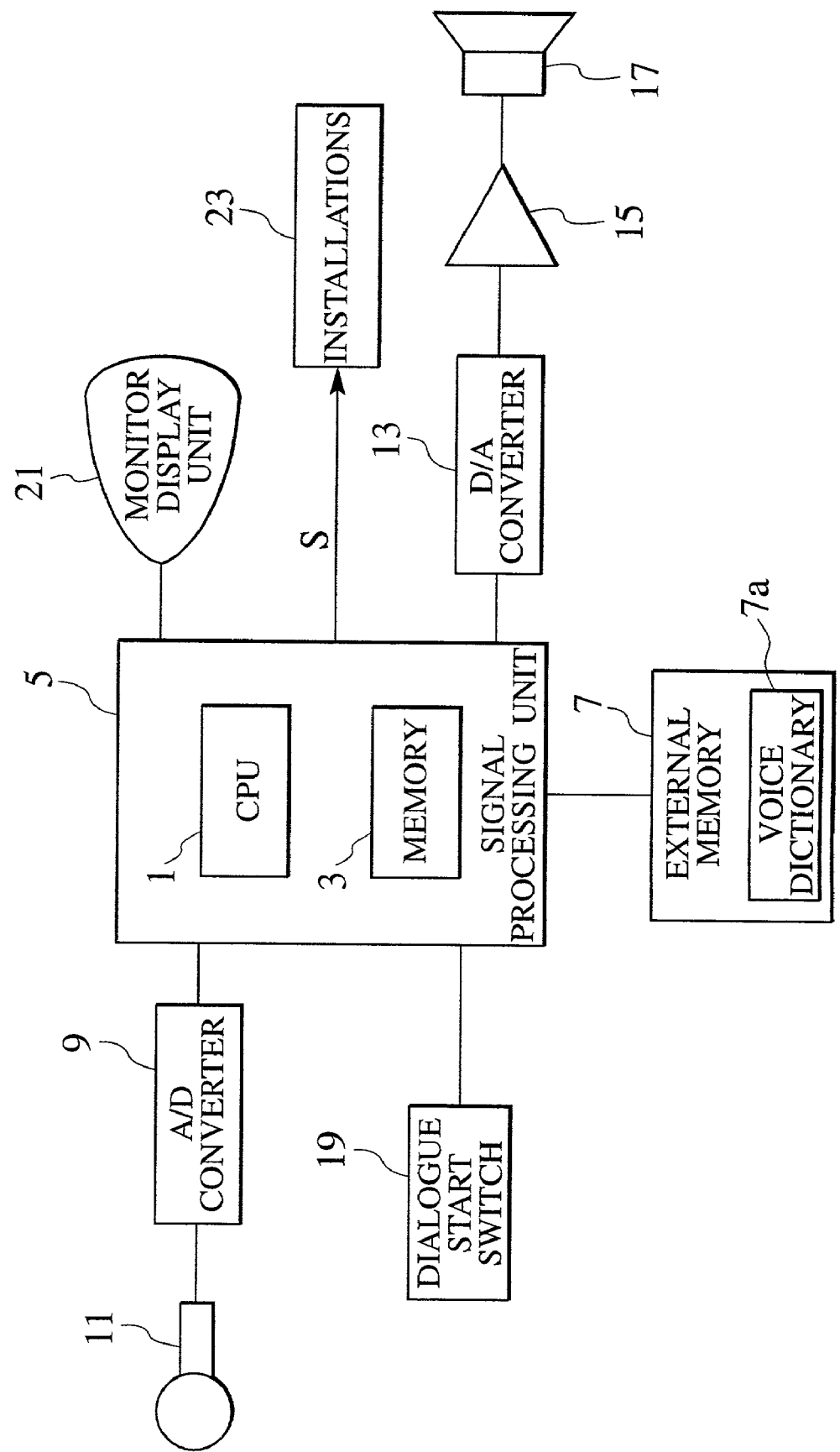
FIG. 1 is a block diagram showing the whole structure of an audio input device proposed in the earlier technology.
Figure 3:
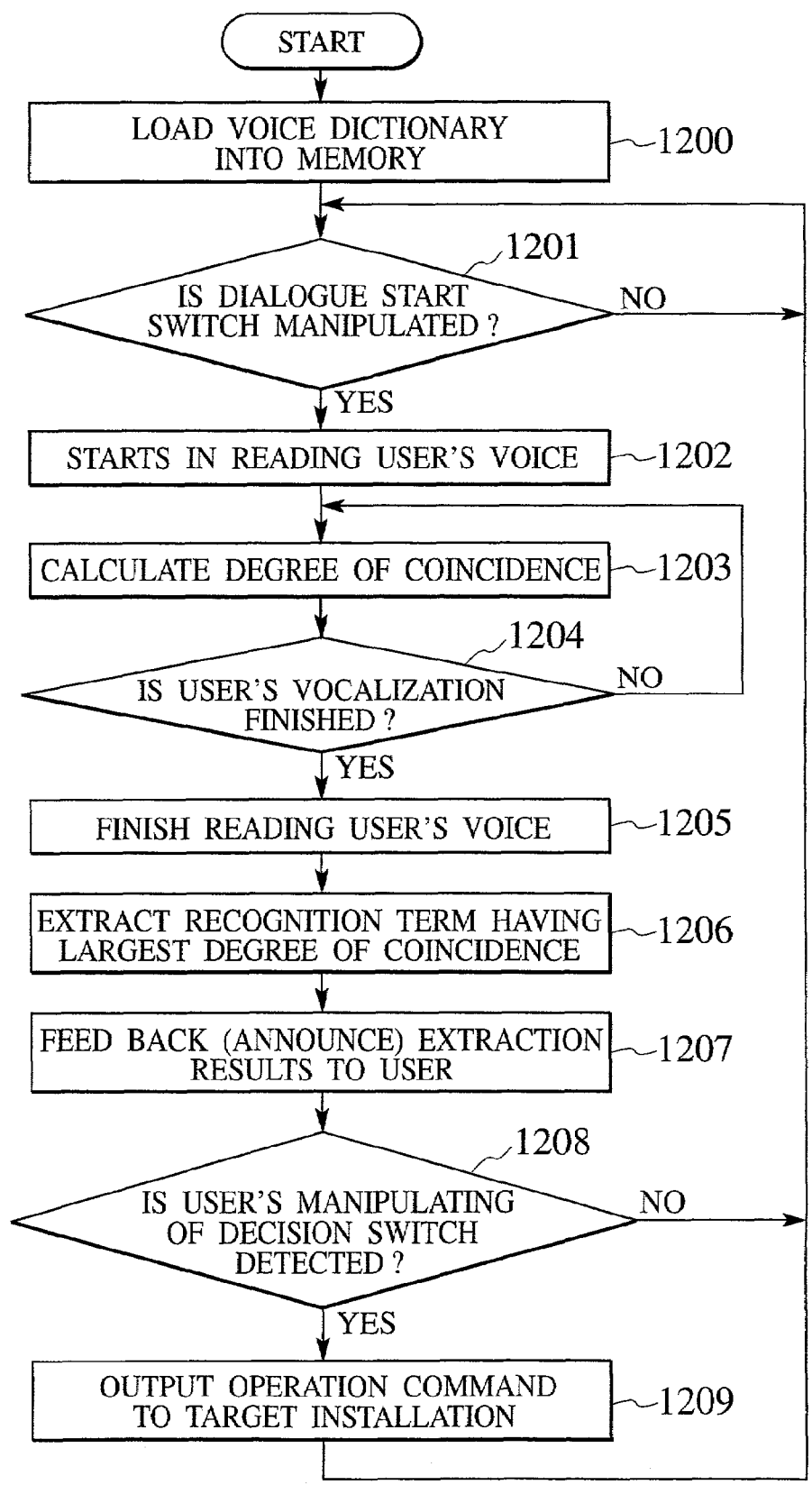
FIG. 3 is a flow chart for explanation of the operation of the audio input device of FIG. 2.
Figure 4:
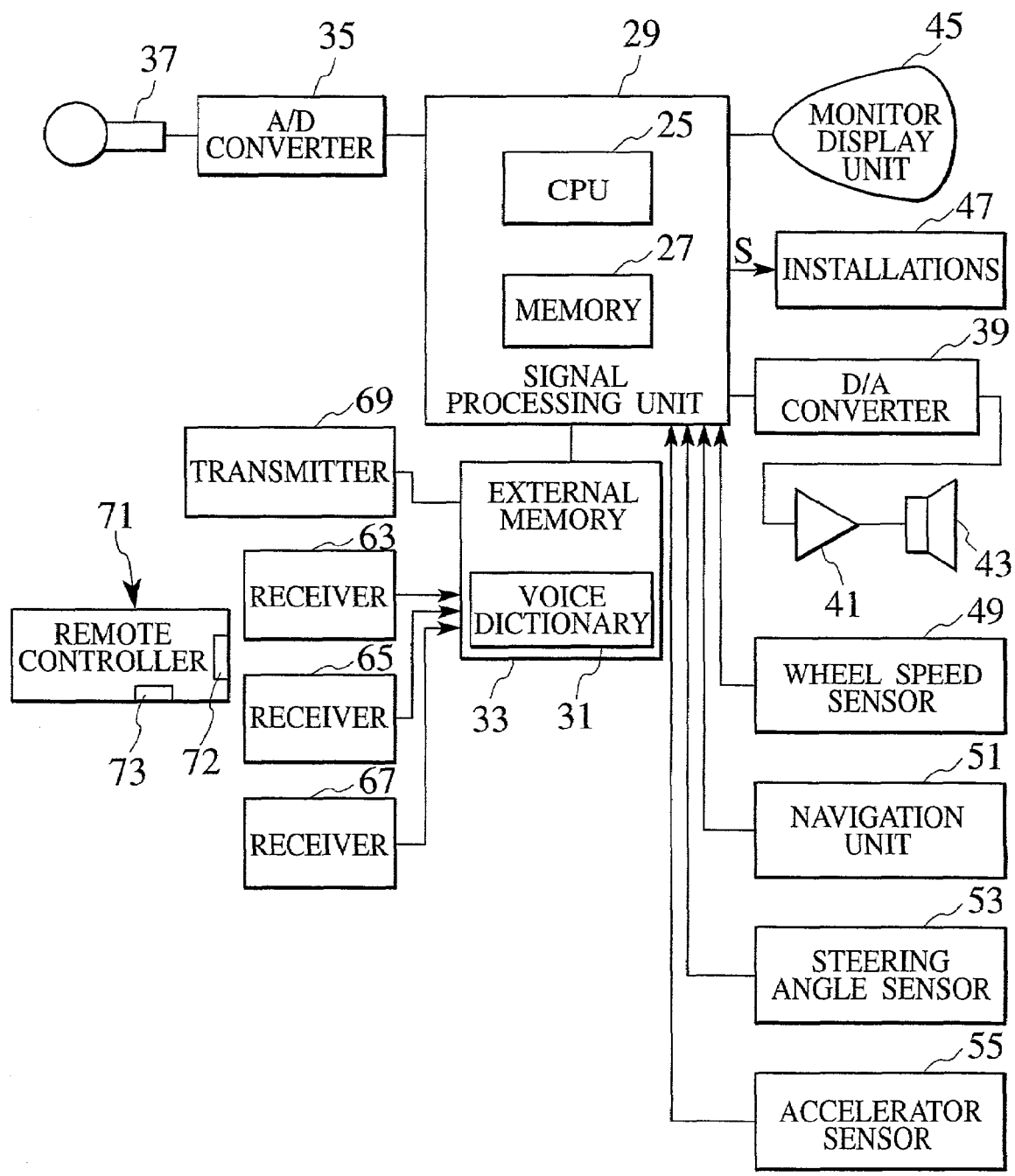
FIG. 4 is a block diagram showing the whole structure of an audio input device in accordance with an embodiment of the present invention.

FIG. 4 is a block diagram of an audio input device in accordance with one embodiment of the invention.

In the embodiment, the audio input device includes a signal processing unit (controller) 29 and an external memory 33 connected with the signal-processing unit 29. The signal-processing unit 29 is provided with a CPU 25 and a memory 27. The external memory 33 includes a voice dictionary 31.

In order to pick up vocalizations of a user, a microphone (pickup unit) 37 is connected to the signal-processing unit 29 through an A/D converter 35. An amplifier 4t for driving a speaker 43 is connected to the signal-processing unit 29 through a D/A convener 39. Further, a monitor display unit 45 is connected to the signal-processing unit 29. In response to a user's voice inputted through the microphone 37, the signal processing unit 29 outputs a control signal S to drive any one of installations 47 to be operated, for example, radio, CD player, air conditioner, etc.

Additionally, a wheel speed sensor 49, a navigation unit 51, a steering angle sensor 53 and an accelerator sensor 55 are respectively connected to the signal-processing unit 29. The unit 29 is adapted so as to input respective detection signals generated from these elements 49, 51, 53, and 55.

Figure 5:
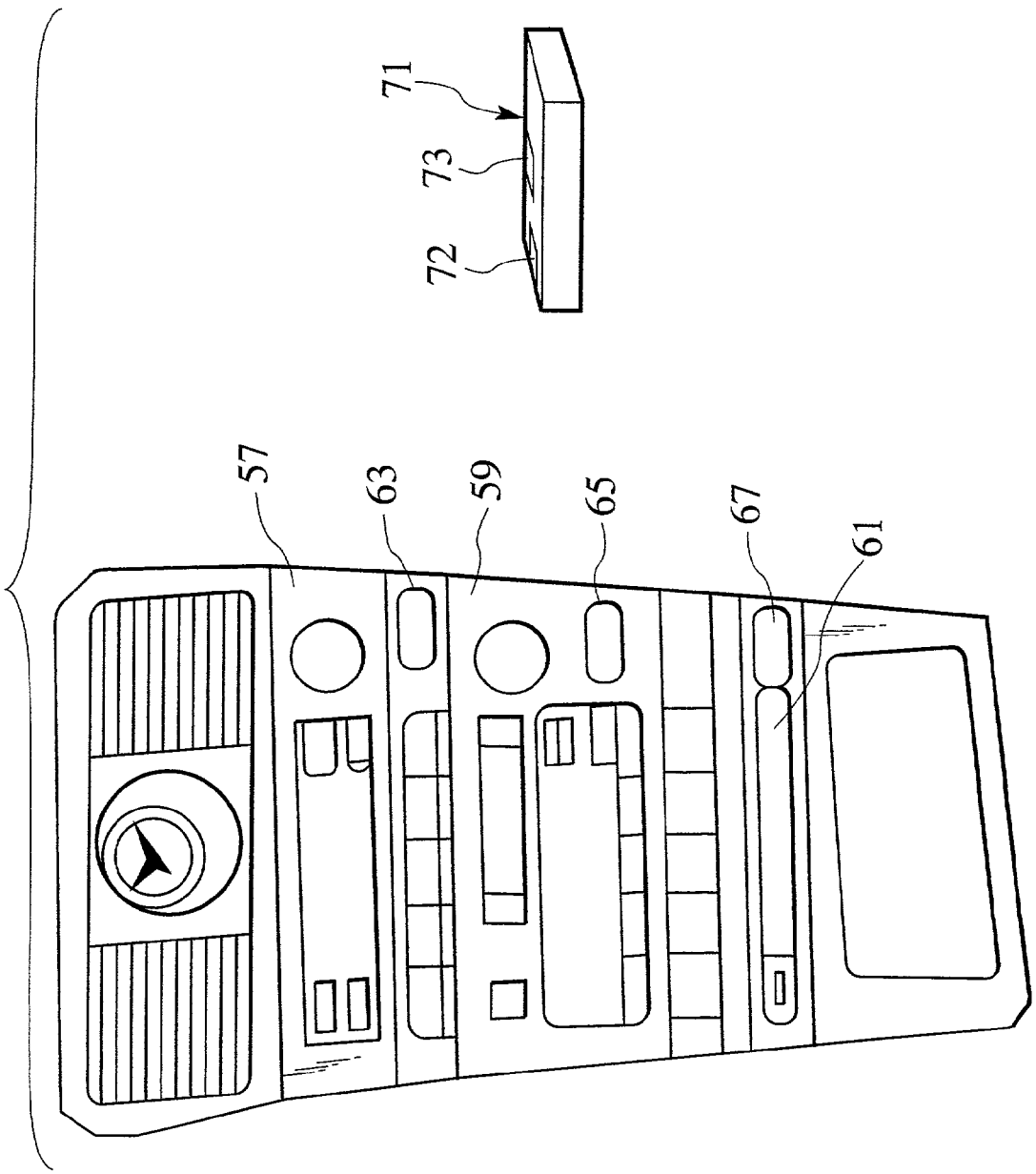
FIG. 5 is an explanatory view showing installations to be operated in the audio input device of FIG. 4, which are arranged in an automotive dashboard.

FIG. 5 shows an automotive dashboard where the above installations 47 are installed. From the top of the automotive dashboard downwardly, there are respectively arranged a built-in control unit 57 for air conditioner, a built-in control unit 59 for car audio system including a radio and a CD player, and a built-in CD port 61. The control unit 57, the control unit 59 and the CD port 61 are provided with a receiver 63, a receiver 65 and a receiver 67, respectively. These receivers 63, 65 and 67 are connected to the external memory 33, so that receiving signals from the receivers 63, 65 and 67 are respectively inputted to the memory 33 (see FIG. 4). Each of the receivers 63, 65 and 67 has a receiving-intensity detecting part for detecting the receiving intensity of a radio wave signal (signal wave) transmitted from a remote controller 71 mentioned later. A transmitter 69 is connected to the external memory 33 to transmit a signal for altering an irradiation area of radio wave from the remote controller 71.

For the remote control to the installations 47, the remote controller 71 transmits radio waves against the respective receivers 63, 65 and 67 The remote controller 71 is provided with a radio-wave transmitter 72 for transmitting the radio waves and a dialogue start switch 73.

FIG. 6 illustrates the contents of the voice dictionary 31 stored in the external memory 33. In the voice dictionary 31, there are stored recognition terms required to operate the radio, the CD player and the air conditioner by the user's vocalizations. The external memory 33 is adapted so as to be able to accept various terms in respective groups represented with numerals 301 to 310 of FIG. 6. Note, in the same figure, each alphabet X represents a definite number. For example, if the recognition terms in the group 306 are extracted as a result of the user's vocalizing of "Cee Dee number ten!", then it is concluded that the speech recognition has been achieved successfully.

Different from the voice dictionary 71a of FIG. 2, the voice dictionary 31 of the embodiment further accepts the recognition terms in the groups 307 to 309 and also the recognition terms in the groups 313 to 315.

Figure 7:
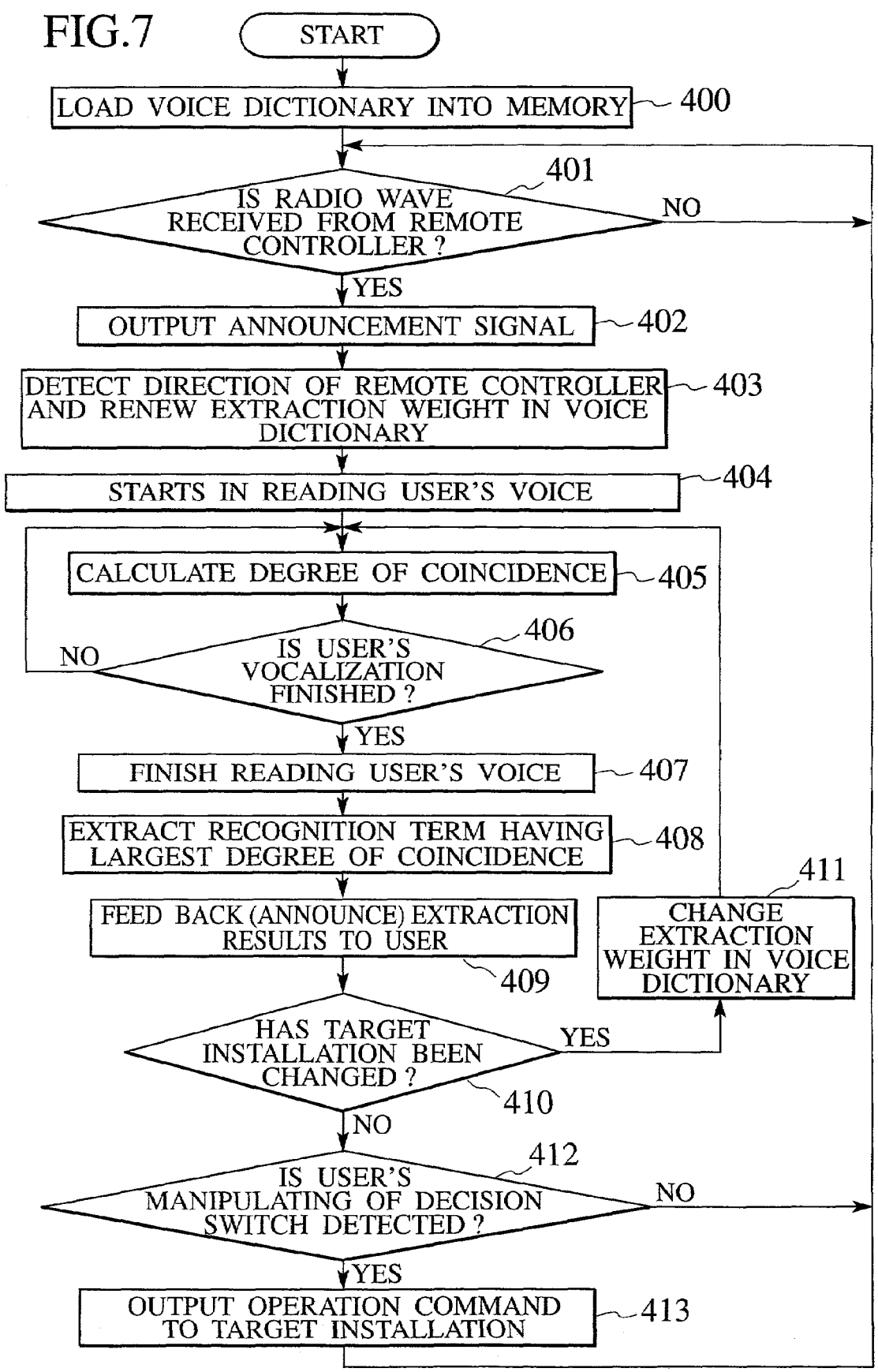
FIG. 7 is a flow chart for explanation of the operation of the audio input device of FIG. 4.

The above-mentioned audio input device operates as follows. FIG. 7 is a flow chart for explanation of the operation of the audio input device.

First, at step 400, the signal-processing unit 29 reads the voice dictionary 31 of the external memory 33 once the audio input device is powered on. At step 401, it is judged whether or not the dialogue start switch 73 is operated by the user. Note, when the dialogue start switch 73 is operated, a radio wave signal is transmitted from the remote controller 71, as a signal wave.

When at least one of the receivers 63, 65, 67 receives the above radio wave signal, in other words, in case of the judgement of Yes at step 401, then the routine goes to step 402 where the signal processing unit 29 outputs an announcement signal stored in the external memory 33 to the speaker 43 through the D/A converter 39 and the amplifier 41 in order to inform the user of the beginning of audio input processing.

Next, at step 403, the signal processing unit 29 changes respective "extraction weights" in the voice dictionary 31 corresponding to which of the installations 47 the remote controller 71 points. In this embodiment, the extraction weights are identical to coefficients used for the calculation of degrees of coincidence mentioned later. Note, the extraction weights are initialized to values of "1.0" at the beginning of the operation of the audio input device, as shown in FIG. 6.

At step 403, in detail, the signal processing unit 29 first compares the receiving intensities of the radio waves that the receiving-intensity detecting parts of the receivers 63, 65, 76 have detected and second estimates the installation 45 having the largest receiving intensity to be an installation 47 that the user is going to manipulate. Further, on detection of the direction of the remote controller 71, the signal-processing unit 29 increases the extraction weight in common with the recognition terms for operating the estimated installation 47. Therefore, the signal processing unit 29 and the receiving-intensity detecting parts of the receivers 63, 65 and 67 together form an estimating section for estimating the installation 47 to which the remote controller 71 is pointed.

For example, it is assumed that the remote controller 71 is now directed to the control unit 59 for a car audio system. Since the car audio system includes the radio and the CD player, the signal processing unit 29 increases the extraction weight to operate the radio and the CD player as shown in FIG. 8. That is, in the renewal of weight, the extraction weight (value: 1.0) in common with all recognition terms of FIG. 6 is altered to a new extraction weight (value: 1.2) for the recognition terms in the groups 301, 302 to operate the radio and the recognition terms in the groups 303 to 309 to operate the CD player. This new extraction weight is multiplied by the degree of coincidence calculated at step 407 mentioned later, producing the new degree of coincidence.

Thereafter if the user vocalizes the terms contained in the voice dictionary 31, for example, "ten piece!", the signal-processing unit 29 detects the user's vocalizations in the following manner.

The sound data inputted through the microphone 37 is convened into digital signals at the A/D converter 35 and subsequently inputted to the signal-processing unit 29. Until receiving the radio wave signal informing tat the dialogue start switch 73 has been pushed by the user, the signal-processing unit 29 has calculated an avenge of the above digital signals with respect to their power (intensity of signals). On condition that the dialogue start switch 73 has been operated, when the instantaneous power of the specified digital signal is larger than the calculated "power" average of the digital signals by a predetermined value, then the signal processing unit 29 judges that the user has vocalized and further starts in reading the user's vocalizations (step 404).

At next step 405, a calculation of the degree of coincidence between the group of recognition terms in the vocal dictionary 31 loaded into the memory 27 and the user's vocalizations is executed by the signal processing unit 29. The calculation of the degree of coincidence is carried out by HMM method as the mainstream of audio recognition algorithm recent years. Note, even when calculating the degree of coincidence, the above-mentioned operation to read the user's vocalizations is maintained by the parallel processing of the unit At step 406, it is judged whether or not the user's vocalizing has finished, For example, when the instantaneous power of the digital signal becomes less than a designated value for a predetermined period, then it is judged tat the user's vocalizing has finished and the routine goes to step 407 where the operation to read the user's vocalizations is ended. While, if the judgement at step 406 is No, the routine returns to step 405 to maintain the above calculation.

Further, the signal-processing unit 29 waits for the completion of calculating the degree of coincidence. In case of the vocalization of "ten piece!", normally, the degree of coincidence will exhibit the largest value at the recognition terms (X=10) in the group 307 (FIG. 6). However, it should be noted that the degree of coincidence of the recognition terms in the other group might exhibit the maximum value, depending on the user's vocalizing character, the circumferential noise, etc. Thus, there still remains a possibility that the degree of coincidence of the recognition terms (X=10) in the group 313 has the largest value.

For example, the degree of coincidence may be expressed by a whole number from zero (0) to a three-figure number. Now, it is assumed that the degree of coincidence of the recognition terms in the group 313 exhibits a maximum value of "600", while the same in the group 307 exhibits a maximum value of "550". Although the simple comparison between these values might result in selecting the former group, that is, causing the erroneous recognition, the signal-processing unit 29 carries out the operation to multiply the degree of coincidence by the above-mentioned extraction weight. Since the value of extraction weight in common with the recognition terms in the group 313 is still equal to 1.0 (see FIG. 8), the final degree of coincidence as the result of the above multiplication amounts to 600 (=600×1.0). On the contrary, since the value of extraction weight in common with the recognition terms in the group 309 is equal to 1.2 (see FIG. 8), the final degree of coincidence as the result of the above multiplication amounts to 660 (=550×1.2). Consequently, the group 307 is extracted as providing the recognition terms whose final degree of coincidence has a maximum value, coinciding with the user's vocalization. In the above way, it is executed to select the recognition terms having the maximum degree of coincidence at step 407.

Thus, according to the embodiment, even if the user vocalizes without the derailed name of the installation (e.g. "Cee Dee" in the above case), it is possible to ensure the ability of recognizing the user's vocalizations sufficiently, allowing the burden on the user to be canceled.

Thereafter, at step 409, the signal-processing unit 29 informs the user of a fact that the recognition term having a high degree of coincidence is now recognized, by means of a phonetic sound. (feedback of recognition results) In detail, at the same step, it is executed to synthesize an audio message of "Now, playing music number ten of CD player!"

from sound data stored in the external memory 33 and further generate the same message to the user through the D/A converter 39, the amplifier 41 and the speaker 43 in order.

At step 410, the signal processing unit 29 checks whether or not the user has corrected the direction of the remote controller 71 to the other installation 47 since the process at step 402 was executed. This process is provided in order to promptly reflect the user's correcting operation coping with the situation where the remote controller 71 is directed to the other installation 47 out of the user's intention. If the judgement at step 410 is Yes, in other words, when there is a correction of the intended installation 47, the routine goes to step 411 to alter the extraction weights corresponding to the correction and thereafter returns to step 405. Consequently, if only redirecting the remote controller 71 against the target installation 47, then the user can dispense with a further vocalization.

Next, at step 412, the signal processing unit 29 judges whether or not a not-shown "decision" switch was pushed for a predetermined period. If the user's manipulation of the decision switch is detected (Yes), then the routine goes to step 413 to output a command to operate the target installation 47 corresponding to the objective recognition terms recognized in this routine. In the above case, there is generated a command to allow the CD player to play the tenth music on the present compact disk installed in the CD player. While, if the judgment at step 412 is "No", that is, no detection of the user's manipulation of the decision switch, then the routine goes back to step 401.

Figure 9:
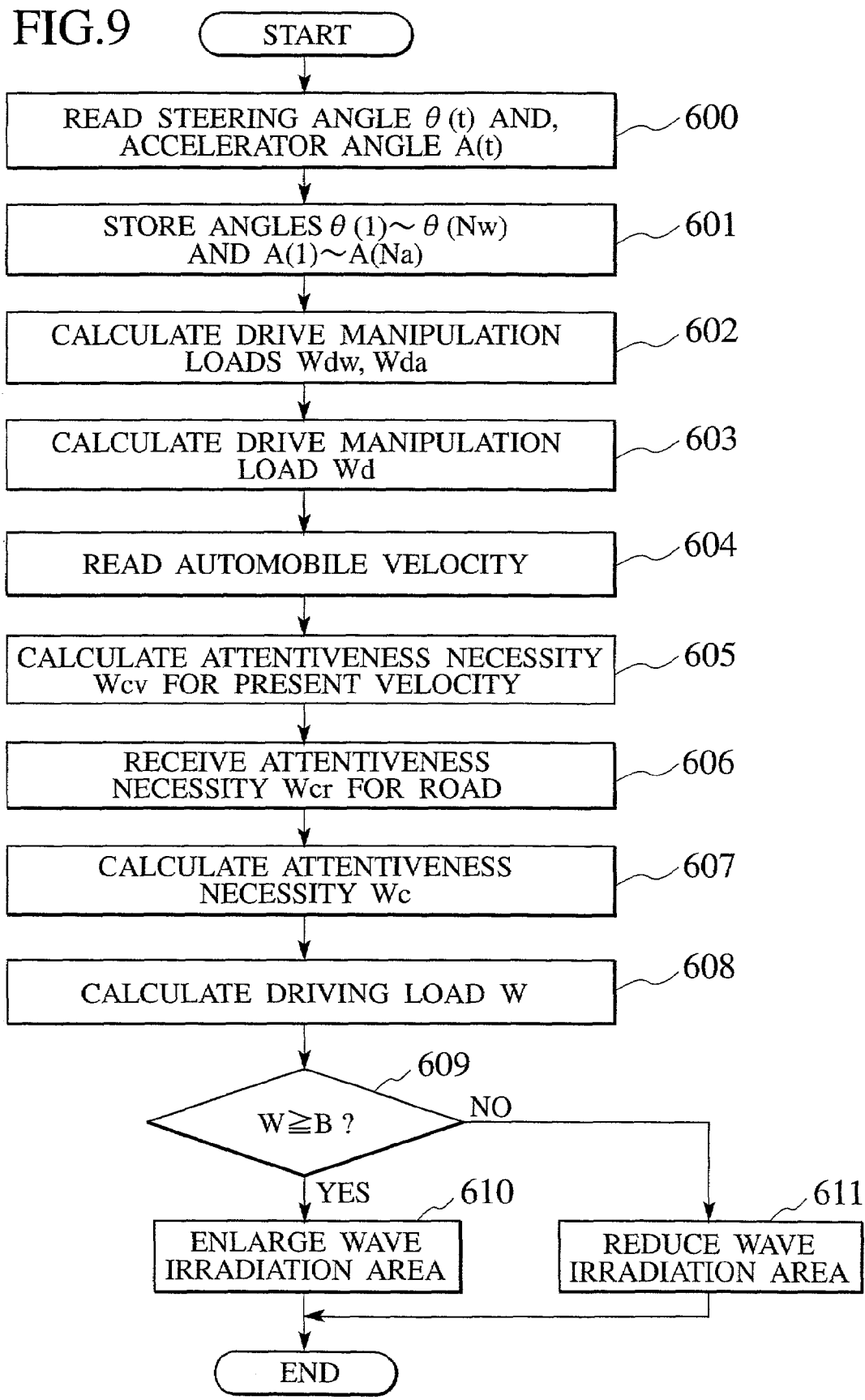
FIG. 9 is a flow chart for explanation of the operation to alter the irradiation area of radio wave corresponding to a driving load, the audio input device of FIG. 4.

FIG. 9 is a flow chart of the operation to alter the irradiation area of radio waves irradiated from the remote controller 71 to the installations 47, corresponding to a driving load on the user driving the automobile. The routine shown with this flow chart is executed at regular intervals of several hundreds msec.

The driving load W is the sum of a drive-manipulation load Wd representing the user's busyness in handling the automobile and an attentiveness-necessity Wc representing a degree of attention to be paid by the user at driving. The drive-manipulation load Wd is the sum of a drive-manipulation load Wdw for handling a steering wheel and a drive-manipulation load Wda for operating an accelerator. The attentiveness-necessity Wc is the sum of an attentiveness-necessity Wcv for the present automobile velocity and an attentiveness-necessity Wcr for a traveling road.

First, we now describe the operation to calculate the drive-manipulation load Wd. Whenever the routine is executed, the signal processing unit 29 reads a user's steering angle θ(t) by the steering angle sensor 53 and an accelerator angle A(t) by the accelerator sensor 55 at step 600. At step 601, it is executed to memorize the read steering angle θ(t) in the past Nw samples [θ(1), θ(2), . . . θ(Nw)] and the read accelerator angle A(t) in the past Na samples [A(1), A(2), . . . A(Na)].

Next, it is executed to calculate the drive-manipulation loads Wd and Wa by the following expressions (1) and (2) at step 602.

$$Wdw = \sum_{n=2}^{Nw} |\theta(n) - \theta(n-1)| / \text{Max}(Wdw) \qquad (1)$$

Note, in the above expression (1), the term "Max(Wdw)" represents a maximum of "Wdw" and can be obtained by way of experiments. The term "Wdw" is limited to "1" at the maximum.

$$Wda = \sum_{n=2}^{Na} |A(n) - A(n-1)| / \text{Max}(Wda) \qquad (2)$$

Note, in the above expression (2), the term "Max(Wda)" represents a maximum of "Wda" and can be obtained by way of experiments. The term "Wda" is limited to "1" at the maximum.

Next, it is executed to calculate the drive-manipulation loads Wd by the following expression (3) at step 603.

$$Wd = k \times Wdw + (1-k) \times Wda \qquad (3)$$

(where: 0<k<1)

In the above way, both of the steering angle sensor 53 and the accelerator sensor 55 form a driving-load detecting unit having a drive-manipulation load detecting part for detecting the user's business in handling the automobile.

At and after step 604, the operation to calculate the attentiveness-necessity Wc will be described. At step 604, the signal-processing unit 29 reads the present automotive velocity V by the wheel speed sensor 49 and thereafter, the routine proceeds to step 605 to calculate the attentiveness-necessity Wcv for the present velocity by the following expression (4).

$$Wcv = V/\text{Max}(V) \qquad (4)$$

Note, in the above expression (4), the term "Max(V)" represents a maximum of "V" and can be obtained by way of experiments. The term "Wcv" is limited to "1" at the maximum.

Next, at step 607, it is executed to receive the attentiveness-necessity Wcr for the traveling road through the navigation unit 51. In the unit 51, there are stored various values of "attentiveness-necessity" for every route. These values are from 0 to 1, respectively. For example, the value for route in a town is set to 0.8, while the value for route in an expressway is set to 0.2.

Next, it is executed to calculate the attentiveness-necessity Wcr for the traveling road by the following expression (5) at step 607.

$$Wc = h \times Wcv + (1-h) \times Wcr \qquad (5)$$

(where: 0<h<1)

In the above way, both of the wheel speed sensor 49 and the navigation unit 51 form the driving-load detecting unit having an attentiveness-necessity detecting part for detecting the necessity of the user's attentiveness in driving the automobile.

Next, it is executed to calculate the driving load W by the following expression (6) at step 608.

$$W = g \times Wd + (1-g) \times Wc \qquad (6)$$

(where: 0<g<1)

At next step 609, it is judged whether the calculated driving load W is more than a predetermined value B or not. When the judgment at step 609 is Yes (W□B), then the routine goes to step 610 where the signal processing unit 29 allows the transmitter 69 to generate a command for enlarging the radio-wave irradiation area to the remote controller 71. Consequently, when the driving load W is large, though the remote controller 71 is not directed to the target installation 47 so precisely, it is possible to transmit the radio wave to the installation 47 in the user's intention certainly, accomplishing the manipulation by speech recognition against the target installation 47.

On the contrary, when the judgment at step 609 is No (W<B), then the routine goes to step 611 where the signal-processing unit 29 allows the transmitter 69 to generate a command for reducing the radio-wave irradiation area to the remote controller 71. Consequently, it is unnecessary to always transmit the radio wave excessively, accomplishing the save in power. Additionally, it is possible to extend the life of a radio wave emitter on the remote controller 71.

Figure 10:
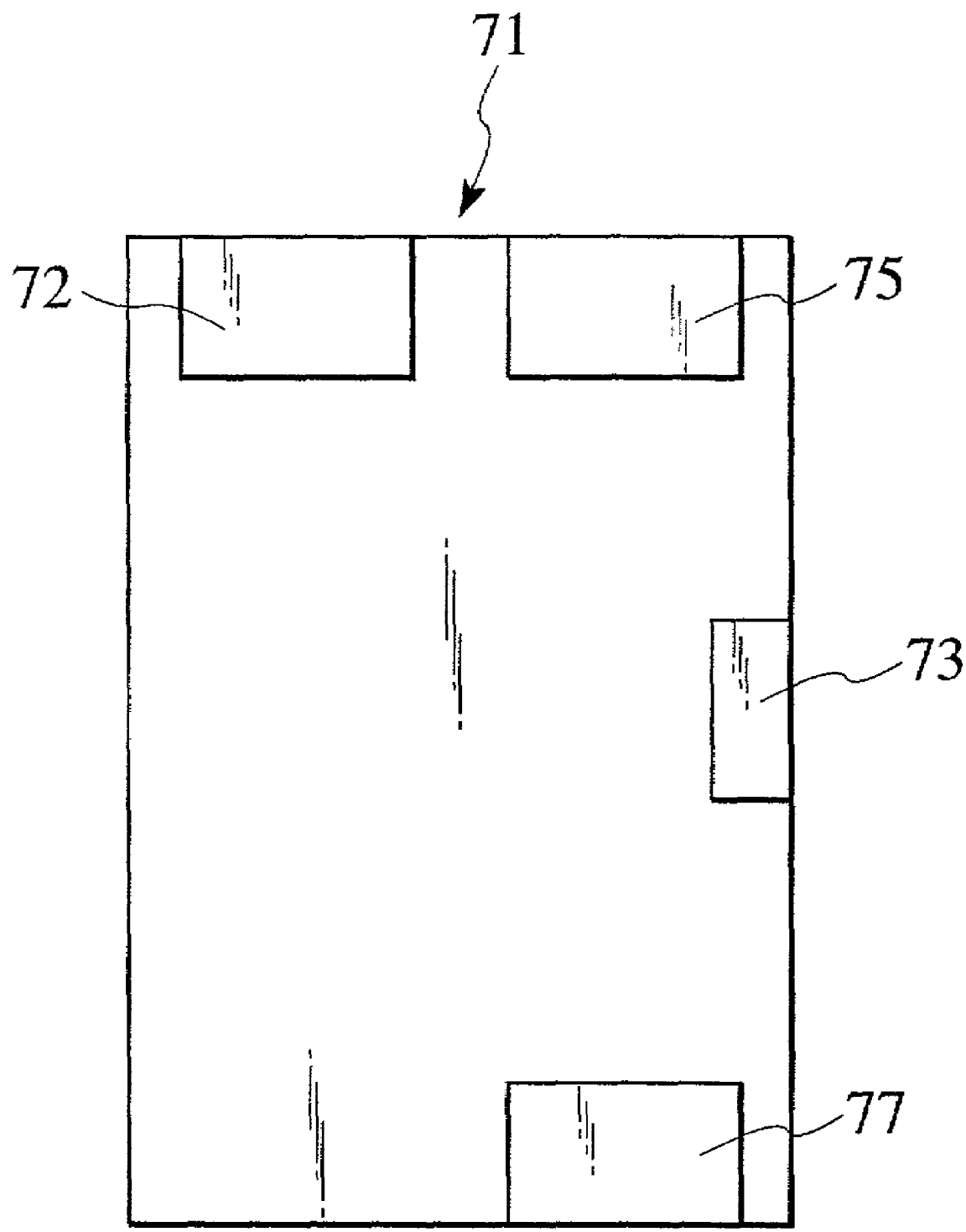
FIG. 10 is an explanatory view of a remote controller used for the audio input device in accordance with another embodiment of the present invention.

Another embodiment of the invention will be described with reference to FIGS. 10, 11 and 12 and also FIG. 7. This embodiment differs from the afore-mentioned embodiment in that the process at step 403 of FIG. 7, i.e., to detect the direction of the remote controller 71 is carried out as follows. In addition to the radio-wave transmitter 72, the remote controller 71 of the embodiment has an ultrasonic transmitter 75 at the front end and another ultrasonic transmitter 77 at the rear end. Using the relationship between the propagation speed of the ultrasonic waves from the transmitters 75, 77 and the position of three ultrasonic receivers arranged at predetermined positions (C1, C2, C3 of FIG. 11) of the automotive compartment, it is executed to calculate the three-dimensional positions of the ultrasonic transmitters 75, 77. If only the positions of the ultrasonic transmitters 75, 77 are obtained, it is possible to detect the direction of the remote controller 71.

Figure 11:
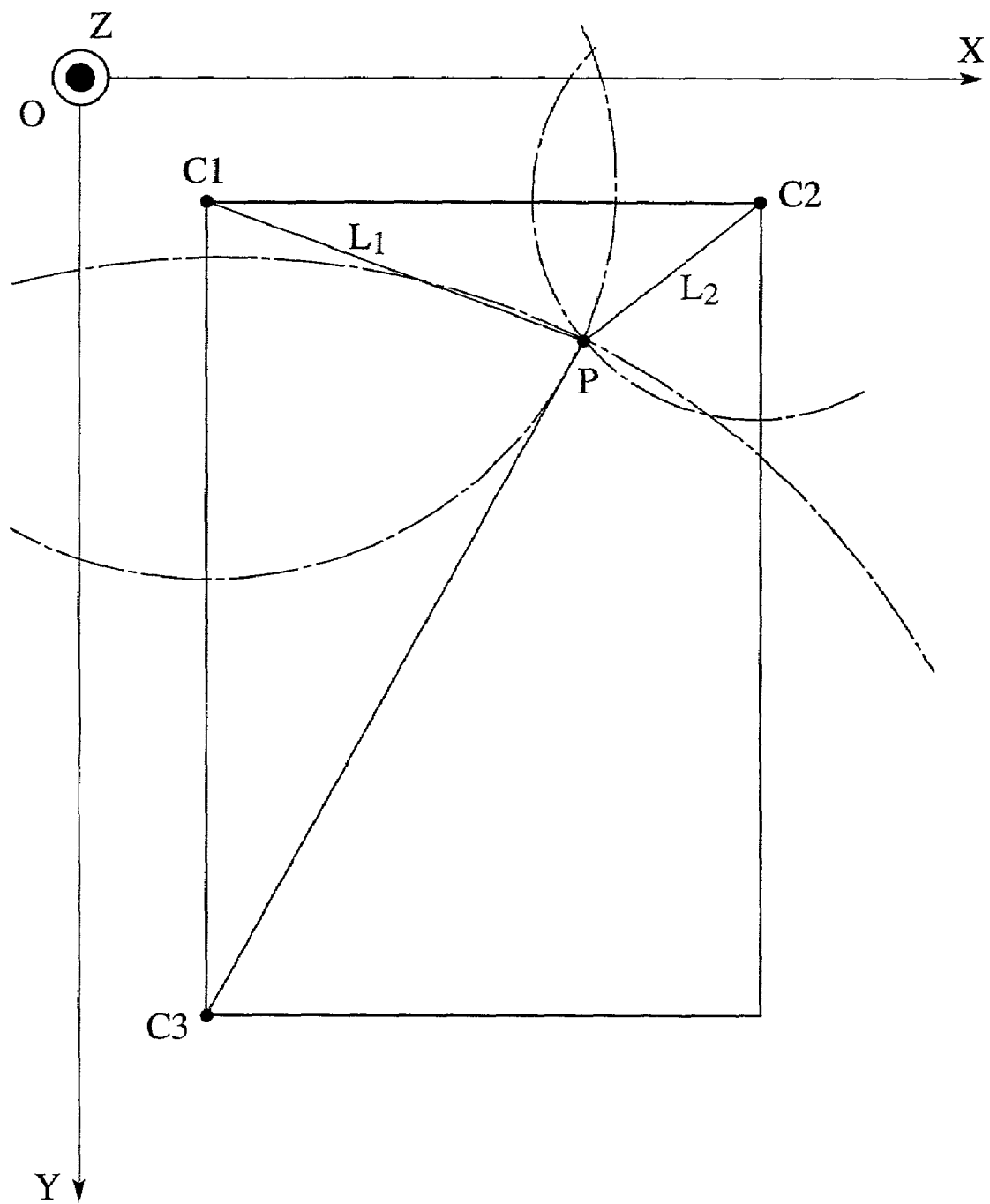
FIG. 11 is an explanatory diagram showing the positional relationship between two ultrasonic transmitters and three ultrasonic receivers of the audio input device of FIG. 10.

FIG. 11 shows the positional relationship between the ultrasonic transmitters 75, 77 and the ultrasonic receivers. In the figure, alphabet P denotes the position of the ultrasonic transmitter 75 (or the ultrasonic transmitter 77), while the ultrasonic receivers are arranged at three positions C1, C2, and C3 respectively. When the dialogue start switch 73 on the remote controller 71 is operated by the user, the controller 71 transmits the radio wave signal for informing the manipulation of the switch 73 through the radio-wave transmitter 72 and simultaneously transmits the ultrasonic waves through the ultrasonic transmitters 75, 77.

Owing to the provision of a built-in timer (not shown), the signal processing unit 29 measures time from the receipt of radio wave signals by any one of the receivers 63, 65, 67 the arrival of ultrasonic waves at the receivers at the positions C1, C2, C3. Since the propagation speed of light is far great in comparison with the propagation speed of sound, the distances Li (L1, L2, L3) between the point P and the positions C1, C2, C3 can be calculated byte following expression (7):

$$Li = Ti \times Vs \qquad (7)$$

where $i=\{1, 2, 3\}$; Ti is a sonic propagation time measured at Ci (C1, C2, C3); and Vs is a sonic propagation speed.

If the coordinates of C1 is expressed by $\{Xi, Yi, Zi\}$, then the coordinates $\{X, Y, Z\}$ of P meets the following expression (8).

$$\{(X-Xi)^2 + (Y-Yi)^2 + (Z-Zi)^2\}^{1/2} = Li \qquad (8)$$

where $i=\{1, 2, 3\}$

Therefore, since there are established three-way simultaneous equations by the expression (8), it is possible to get a solution. Consequently, the coordinates of the ultrasonic transmitter 75 (or the ultrasonic transmitter 77) can be obtained.

When the coordinates of the ultrasonic transmitters 75, 77 are obtained by the above principle, as shown in FIG. 12, it is possible to detect the direction D of the remote controller 71, in other words, which of the installations 47 the remote controller 71 is directed to, with ease.

In the above way, all the ultrasonic transmitters 75, 77, the ultrasonic receivers (C1, C2, C3) and the signal processing unit 29 do form the position-and-direction detecting unit as the estimating section for estimating the direction of the remote controller 71. Additionally, the signal-processing unit 29 has a transmitter detecting part for detecting respective three-dimensional positions of the ultrasonic transmitters 75, 77.

Although the invention has been described above by reference to two embodiments of the invention, the invention is not limited to the embodiments described above. Modifications and variations of the embodiments described above will occur to those skilled in the art, in light of the above teachings.

For example, although the above-mentioned embodiments commonly take example by the application of the audio input device on the built-in installations of the automobile, the audio input device of the invention is applicable to a control system for "in-door" audio system, robots or the like.

The contents of Japanese patent application No. 2000-310115 (filed on Oct. 11, 2000) is expressly incorporated by reference herein in its entirety.

The scope of the invention is defined with reference to the following claims.

What is claimed is:

1. An audio input device comprising:
  a plurality of installations to be operated;
  a pickup unit for picking up vocalizations of a user;
  a speech dictionary for storing objective recognition terms corresponding to the operations of the installations, the objective recognition term being classified with extraction weight for every installation;
  a remote controller operated by the user to transmit a signal wave to each of the installations to carry out remote control of the installations; and
  a controller connected to the installations, the pickup unit and the speech dictionary, the controller having:
    a calculating section for calculating respective degrees of coincidence between the user's vocalizations inputted through the pickup unit and the objective recognition terms in the speech dictionary;
    an extracting section for extracting the objective term having the highest degree of coincidence, from the speech dictionary;
    an operating section for generating an operation command to one of the installations on the ground of an extraction result transmitted from the extracting section; and
    an estimating section for estimating the installation at which the remote controller is pointed by the user,
    wherein, at the calculation of the degrees of coincidence on receipt of the user's vocalizations, the controller makes the extraction weight of the objective recognition terms concerned with the installation estimated by the estimating Section, larger than the extraction weight of the objective recognition terms concerned with the other installation.

2. The audio input device of claim 1, wherein
the estimating section has a receiving-intensity detecting part the signal wave transmitted from the remote controller to detect a receiving intensity of the signal wave received; and
the larger the installation has a receiving intensity of the signal wave detected by the receiving-intensity detecting part, the larger the extracting section makes the extraction weight of the objective recognition terms concerned with the installation.

3. The audio input device of claim 1, wherein the estimating section has a position-and-direction detecting unit for detecting both three-dimensional position and direction of the remote controller.

4. The audio input device of claim 3, wherein the position-and-direction detecting unit includes:
at least two ultrasonic transmitters arranged in the remote controller;
at least three ultrasonic receivers arranged in the circumference of the remote controller, the ultrasonic receiver receiving the ultrasonic waves transmitted from the ultrasonic transmitter; and
an ultrasonic transmitter detecting part for detecting respective three-dimensional positions of the ultrasonic transmitters on a basis of the times from the transmission of ultrasonic waves by the ultrasonic transmitters to the arrival of ultrasonic waves at the ultrasonic receivers.

5. The audio input device of any one of claim 1, wherein the installations are installed in a vehicle compartment.

6. The audio input device of claim 5, further comprising a driving-load detecting unit for detecting a driving load on a driver who drives the vehicle.

7. The audio input device of claim 6, wherein the driving-load detecting unit has a driving-load detecting part for detecting a busyness of driving the vehicle, and the driving-load detecting unit outputs the command signal to enlarge the irradiation area of the signal wave transmitted from the remote controller when the driving load detected by the driving-load detecting part is more than a predetermined value.

8. The audio input device of claim 6, wherein the driving-load detecting unit has an attentiveness-necessity detecting part for detecting a necessity of the driver's attentiveness in driving the vehicle, and the driving-load detecting unit outputs the command signal to enlarge an irradiation area of the signal wave transmitted from the remote control when the necessity of attentiveness detected by the attentive-necessity detecting part is more than a predetermined value.

9. The audio input device of claim 1, wherein the controller re-extracts extracts the objective recognition term having the highest degree of coincidence from the speech dictionary when the direction of the remote controller is after the objective recognition term having the highest degree of coincidence has been extracted by the extracting section.

10. The method of claim 1, further comprising when the direction of the remote controller is changed after the objective recognition term having the highest degree of coincidence has been extracted by the extracting section,
re-calculating respective degrees of coincidence between the vocalizations inputted through the pickup unit and the objective recognition terms in the speech dictionary; and
re-extracting an objective recognition term having the highest degree of coincidence, from the speech dictionary.

11. An audio input device comprising:
a plurality of installations to be operated;
a pickup unit for picking up vocalizations of a user;
a speech dictionary for storing objective recognition terms corresponding to the operations of the installations, the objective recognition term being classified with extraction weight for every installation;
means for calculating respective degrees of coincidence between the vocalizations inputted through the pickup unit and the objective recognition terms in the speech dictionary
means for extracting an objective recognition term having the highest degree of coincidence, from the speech dictionary;
means for operating one of the installations on the ground of an extraction result transmitted from the extracting section;
a remote controller operated by the user to transmit a signal wave to each of the installations to carry out remote control of the of the installations; and
means for estimating the installation at which the remote controller is pointed by the user;
wherein, at the calculation on receipt of the user's vocalizations, the extraction weight of the objective recognition terms concerned with the installation estimated by the estimating means is established larger than the extraction weight of the objective recognition terms concerned with the other installation.

12. A method of controlling an audio input device having a plurality of installations to be operated, a pickup unit for picking up vocalizations of a user, a speech dictionary for storing objective recognition terms corresponding to the operations of the installations, the objective recognition term being classified with extraction weight for every installation, and a remote controller operated by tile user to carry out remote control of the installations by transmitting a signal wave to each of the installations, the method comprising:
calculating respective decrees of coincidence between the vocalizations inputted through the pickup unit and the objective recognition terms in the speech dictionary;
estimating the installation at which the remote controller is pointed by the user;
extracting an objective recognition term having the highest degree of coincidence, from the speech dictionary; and
operating one of the installations on the ground of a result of the extracting operation;
wherein, at the calculating operation, the extraction weight of the objective recognition terms concerned with the installation estimated by the estimating operation as established larger than the extraction weight of the objective recognition terms concerned with the other installation.

* * * * *